United States Patent [19]

Mathews et al.

[11] Patent Number: 5,420,726
[45] Date of Patent: May 30, 1995

[54] CHANNEL QUALIFIER FOR A HARD DISK DRIVE WHICH DIFFERENTIATES A RAW DATA SIGNAL BEFORE PEAK DETECTION AND QUALIFICATION OF THE SIGNAL

[75] Inventors: Harlan P. Mathews, Boulder; Robert E. Gercken, Longmont; Patrick L. Adcock, Lakewood, all of Colo.

[73] Assignee: Maxtor Corporation, San Jose, Calif.

[21] Appl. No.: 198,107

[22] Filed: Feb. 17, 1994

[51] Int. Cl.⁶ .................. G11B 5/09; G01R 33/12
[52] U.S. Cl. .................... 360/46; 324/212
[58] Field of Search .............. 360/46, 45, 53, 51, 360/31, 41, 30, 15, 40; 307/354, 494; 324/212, 103 P

[56] References Cited

U.S. PATENT DOCUMENTS

| | | | |
|---|---|---|---|
| 4,467,374 | 8/1984 | Batgy et al. | 360/46 |
| 4,480,276 | 10/1984 | Batey et al. | 360/46 |
| 4,495,529 | 1/1985 | Gustafson | 360/46 |
| 4,697,098 | 9/1987 | Cloke | 307/354 |
| 4,729,045 | 3/1988 | Paugh | 360/53 |
| 4,929,894 | 5/1990 | Monett | 324/212 |
| 4,987,500 | 1/1991 | Bizsak et al. | 360/46 |
| 5,150,050 | 9/1992 | Genheimer et al. | 324/212 |
| 5,270,875 | 12/1993 | Shah et al. | 360/46 |
| 5,287,227 | 2/1994 | Cronch et al. | 360/45 |

*Primary Examiner*—Aristotelis Psitos
*Assistant Examiner*—Patrick Wamsley

[57] ABSTRACT

A differentiating qualifier channel in a hard disk drive. The analog signal read off a magnetic disk by the transducer is amplified and filtered, then immediately differentiated. This differentiated waveform is used to both qualify and to detect the peaks of the analog read signal. Data pulses are qualified by noting that the differentiated waveform always changes polarity after the zero-crossing of a valid peak. Positive and negative peak signals are generated whenever the differentiated waveform exceeds established positive and negative thresholds. From this, a polarity signal is constructed. The pulses indicating where the polarity signal changes states are used to enable a latch. The latch is clocked by a zero-crossings signal which has been delayed such that the zero-crossings occur after the change in polarity. The output from this latch gives the valid qualified data pulses.

8 Claims, 3 Drawing Sheets

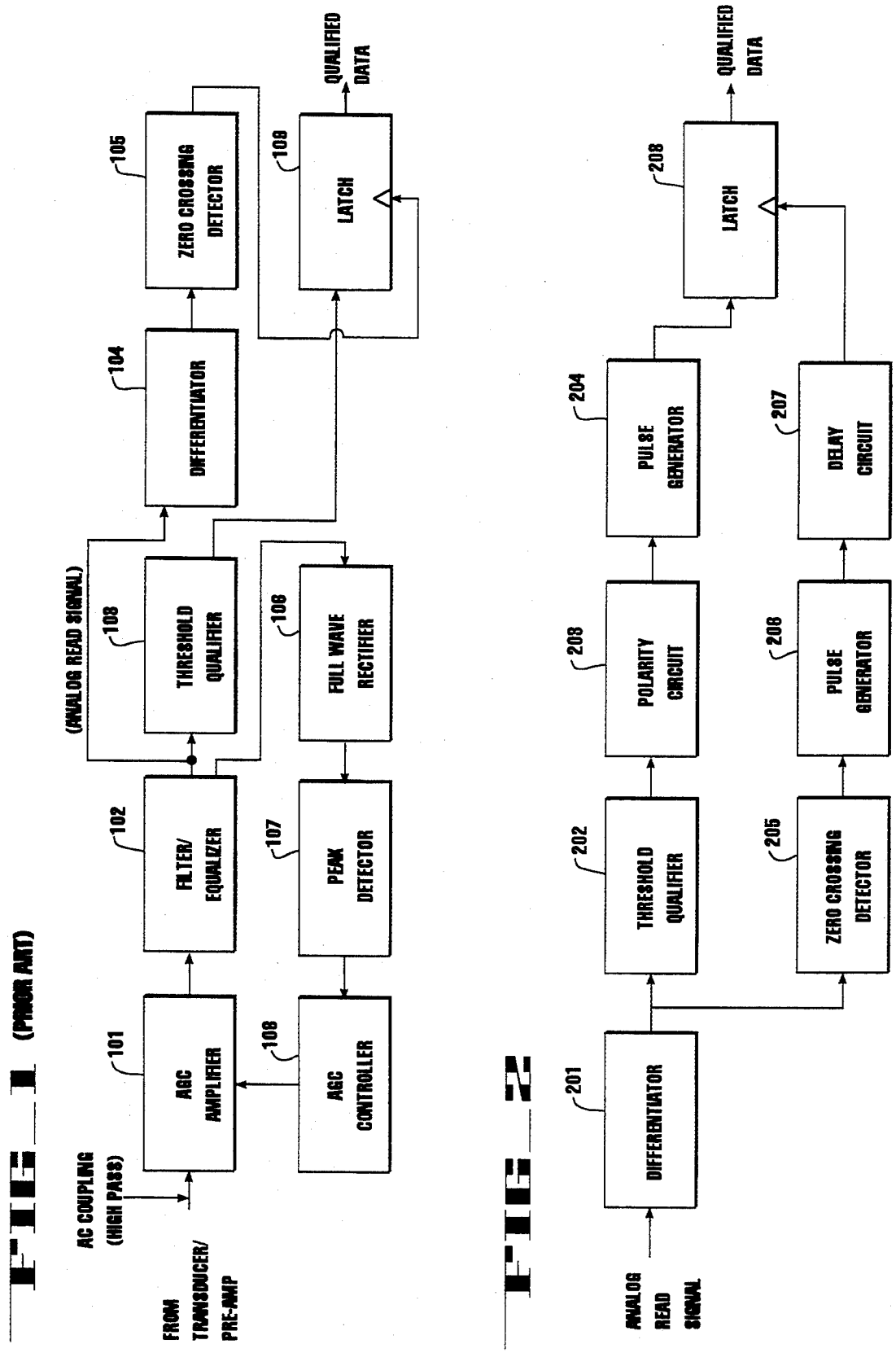

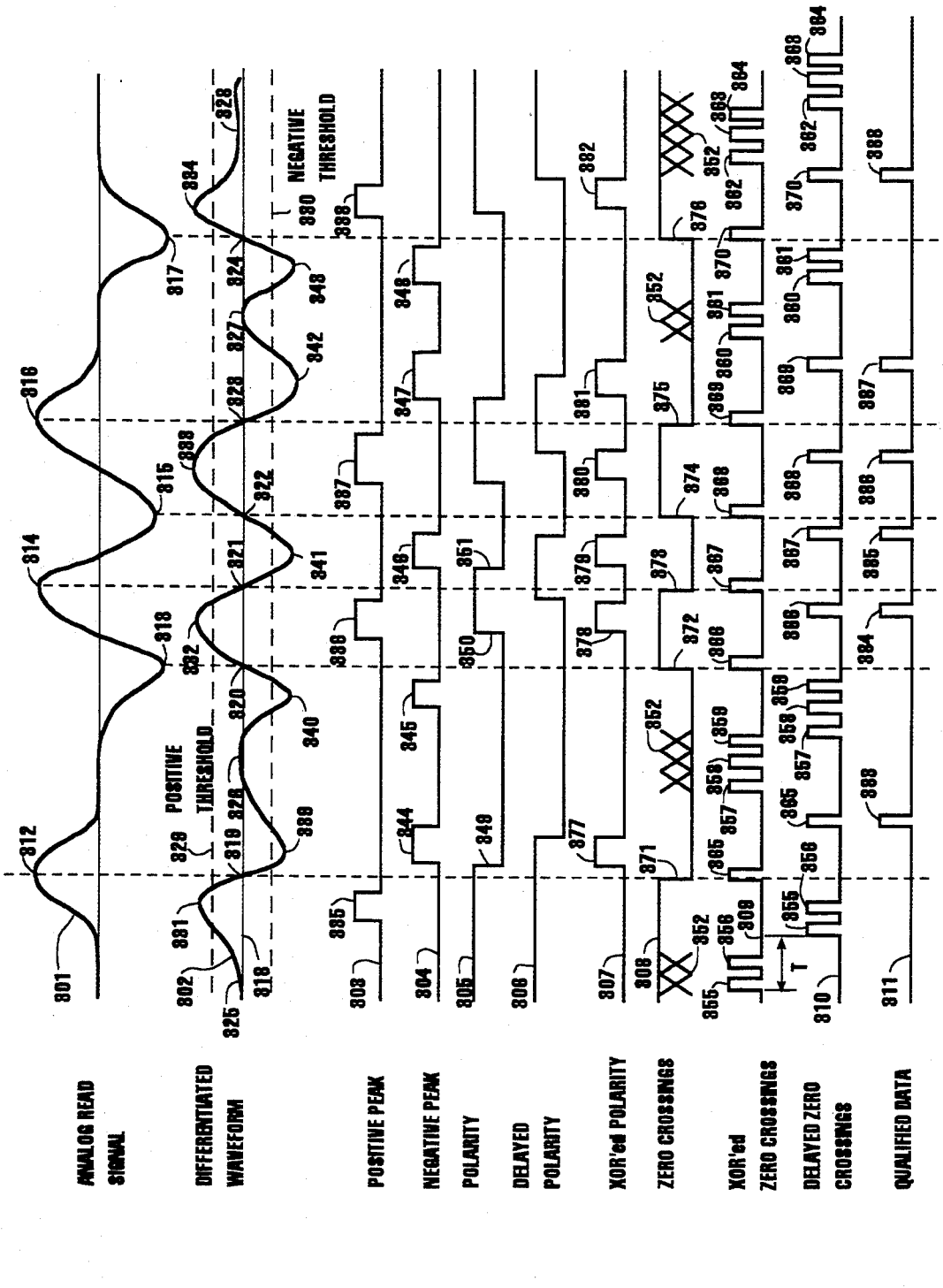

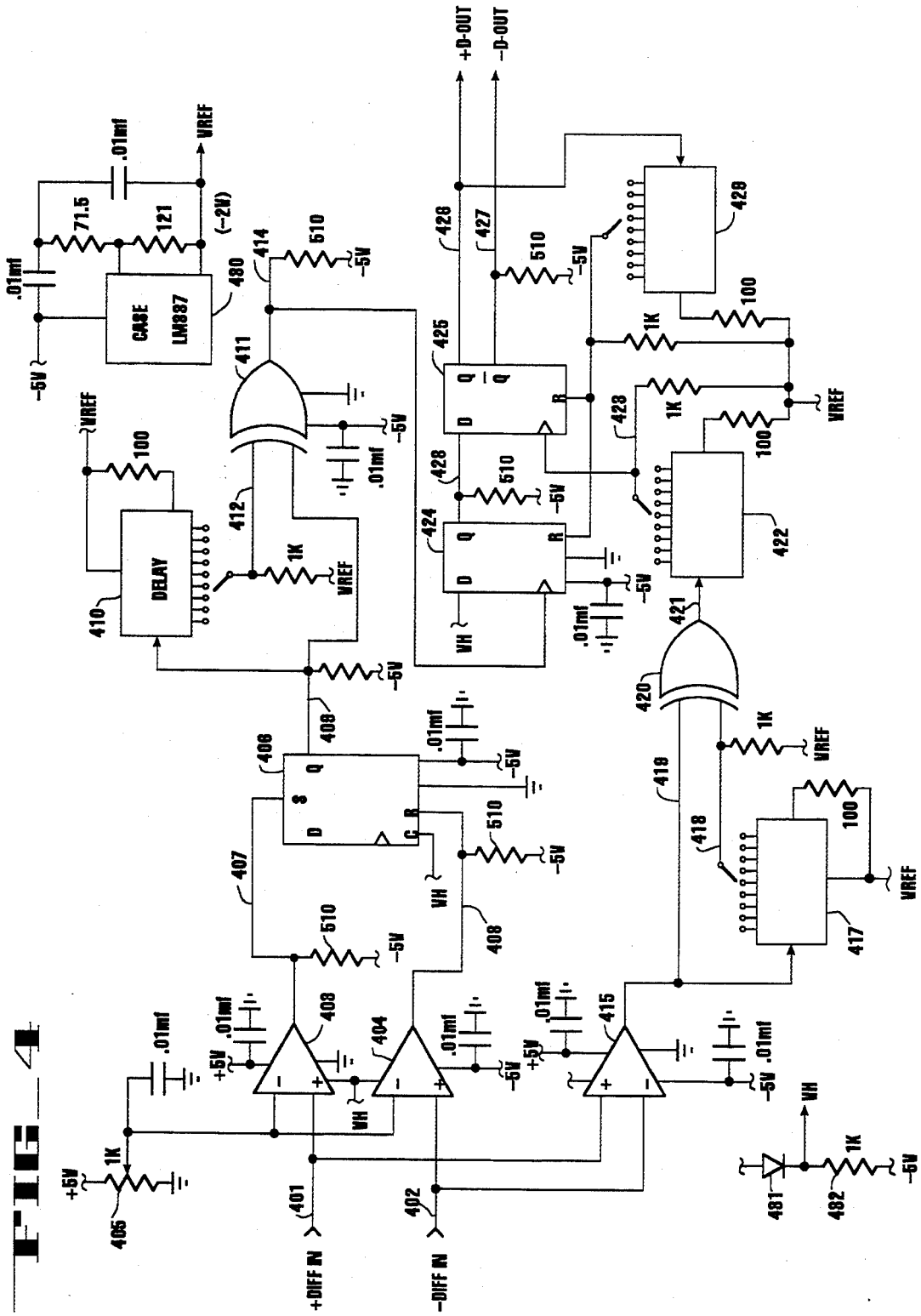
FIG_4

CHANNEL QUALIFIER FOR A HARD DISK DRIVE WHICH DIFFERENTIATES A RAW DATA SIGNAL BEFORE PEAK DETECTION AND QUALIFICATION OF THE SIGNAL

FIELD OF THE INVENTION

The present invention pertains to the field of magnetic recording devices. More specifically, the present invention relates to a differentiating channel qualifier for optimizing the read/write channel characteristics.

BACKGROUND OF THE INVENTION

Today, hard disk drives are widely used to store digital data because of their high storage capacity, economy, and random access capability. A hard disk drive is comprised of a stack of one or more magnetic disks. One or more transducers, also known as "heads," are used to write data onto the surfaces of these disks. Often, the same head is used to both write the data to and read the data from the disk. When data are written, the disk is spun about a spindle. As the head is moved radially across the surface of the spinning disk, data are written onto a number of concentric circles, commonly referred to as "tracks."

The digital data are stored as a series of binary bits. An encoding scheme is implemented in order to map these binary bits into a pattern that is compatible with the recording media of the data disk. In other words, the encoding scheme enables the hard disk drive system to physically distinguish between each of the bits stored in a track. One popular encoding scheme is a 1,7 code. The 1,7 code specifies that there should be a minimum of one and a maximum of seven "0's" between each pair of "1's". Hence, the spatial frequency of this type of encoding depends upon the particular sequence of digital data written onto the disk.

However, due to the far fringing of heads at low frequencies, the inductive heads sense long wavelength signals for wider than their physical width. For example, given a head width of approximately 6.3 microm, the head is still receptive to 0.1 MHz data that is four times the head width away. Indeed, low frequency signals exhibit a much wider reaching amplitude sensitivity than higher frequency signals. And since the 1,7 code has a spectral frequency content which extends all the way to 0 Hz, whenever an adjacent track is written, the head will inherently pick up that track's low frequency components. This adjacent track read problem might result in errors in reading data by traditional data qualifiers.

FIG. 1 shows a typical prior art read channel employing a traditional data qualification design. The data stored on the disk are converted into an analog electrical signal by the head. This electrical signal is amplified by a pre-amp. It is then AC coupled (high pass). Note that the frequency of this high pass is typically $$\frac{1}{100}x,$$

the lowest data frequency. Further amplification and/or attenuation is performed by the automatic gain control circuitry 101. The electrical signal is then filtered by a low pass filter and the high frequency components are equalized by block 102. The output from the filter/equalizer 102 is input to the full wave rectifier 106. Furthermore, the peaks of each of the pulses of the electrical signal read from the disk are qualified according to a positive and a negative threshold of threshold qualifier block 103. The output of the threshold qualifier 103 is coupled to the input of latch 109. When the analog read signal exceeds either the positive or negative threshold, a qualifier pulse is generated. Also, the analog signal is differentiated by the differentiator block 104. The resulting differentiated signal is then input to the zero-crossing detector 105. Zero-crossing detector 105 is usually a zero volt comparator. Whenever the threshold qualifier signal is "high" and the zero-crossings signal changes state, a valid data pulse is output from latch 109. Note that when the differentiated signal is near a zero crossing, the zero-crossing signal toggles, but these spurious transitions are not qualified by the threshold and are, hence, ignored. The analog read-signal from filter 102 is also fed back through a full wave rectifier 106, peak detector 107, and AGC controller 108 to the AGC amplifier 101.

Thus, it can be seen that the typical prior art magnetic recording data qualifier passes the analog read signals through a simple low pass filter with perhaps some equalization boost. Unfortunately, this approach allows the low frequencies above the frequency of the A.C. coupling high pass to pass through. It has been determined that there can be approximately a 10% low frequency modulation on the data qualifier signal which causes errors. The adjacent track read problem is so severe that writing a 2T-2T-8T stress pattern (this stress pattern repetition rate emphasizes a low frequency corresponding to a 24T period, wherein T is the encoded dock period) on an adjacent track will often result in an error rate which causes the drive to fail. This problem is becoming even more acute as track widths become smaller and areal densities continue to increase.

Furthermore, it can be seen that the prior art of channel qualifiers typically has a threshold qualification path which is not differentiated. It is rather difficult to equalize and optimize the same head signal shapes for the qualifier path and for the differentiator path at the same time because of their conflicting requirements.

Thus, there is a need in the prior art of hard disk drives for a more robust threshold and qualification design. It would be preferable if such a design could differentiate the analog data signal first, thereby attenuating the low frequency adjacent track signals. It would also be highly preferable if such a design could improve the optimization capability of the read/write channel characteristics by eliminating the separate filtering of the threshold qualifier path.

SUMMARY AND OBJECTS OF THE INVENTION

The present invention pertains to a differentiating qualifier channel in a hard disk or tape drive. In the present invention, the analog signal read off a magnetic disk by the transducer is immediately differentiated. This differentiated waveform is used both to qualify and to detect the peaks of the analog read signal. Data pulses are qualified by noting that the differentiated waveform always changes polarity after the zero-crossing of a valid peak. The changes in polarity are detected by generating positive and negative peak signals whenever the differentiated waveform exceeds established positive and negative thresholds. From this, a polarity signal is generated. A number of polarity pulses are generated corresponding to changes in the state of the polarity signal. These polarity pulses are used to enable a latch. This latch is locked by a zero-crossings signal which has been delayed, such that the zero-crossings occur after the change in polarity. The output from this latch gives-the valid qualified data pulses.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 shows a typical prior art read channel employing a traditional data qualification design.

FIG. 2 shows a block diagram of the currently preferred embodiment of a differentiating qualifier channel of the present invention.

FIG. 3 is a timing diagram showing the timing and waveforms for various signals of the differentiating qualifier channel.

FIG. 4 shows a detailed circuit diagram of the currently preferred embodiment of the differentiating channel qualifier of the present invention.

DETAILED DESCRIPTION

A differentiating channel qualifier in a hard disk drive is described. In the following description, numerous specific details such as threshold levels, timing diagrams, waveforms, zero-crossing, etc., are set forth in order to provide a thorough understanding of the present invention. It will be apparent, however, to one skilled in the art that the present invention may be practiced without these specific details. In other instances, well-known structures and devices are shown in schematic form in order to avoid unnecessarily obscuring the present invention.

FIG. 2 shows a block diagram of the currently preferred embodiment of a differentiating qualifier channel of the present invention. In the present invention, the analog signal is read from the disks, amplified, filtered and equalized as before. This signal (analog read) is immediately differentiated by the differentiator block 201, before any qualification process is performed. This differentiated waveform is used to both qualify and to detect the peas. This approach allows the low frequency content of the code to be suppressed, thereby rendering this channel much less sensitive to adjacent track noise. The data locations are detected by noting that the differentiated waveform always changes polarity after the zero-crossing of a valid peak. The differentiated waveform is then qualified by the threshold qualifier block 202. The threshold qualifier block 202 establishes a positive threshold level and a negative threshold level. A positive peak signal is generated to indicate those times when the differentiated waveform exceeds the positive threshold. Likewise, a negative waveform falls below the negative threshold. The polarity circuit 203 takes these two positive and negative peak signals and generates a "polarity" signal. Essentially, the polarity signal changes states whenever the differentiated waveform changes polarity. This polarity signal is sent to a pulse generator 204 in order to create a pulse corresponding to each change in polarity. In the currently preferred embodiment, the polarity pulses are generated by delaying the polarity signal and exclusive ORing (XOR) the original polarity signal with the delayed version of itself. Other embodiments, such as using the polarity signal to trigger a one-shot for generating the pulses, can also be utilized. These polarity pulses are subsequently used to enable a latch 208, which is clocked by the zero-crossing pulses in order to output the valid qualified data.

The differentiated waveform from differentiator 201 is also fed into the zero-crossing detector 205. As expected, the zero-crossing's signal output from the zero-crossing detector 205 contains the valid peaks of the analog signal as well as extra, spurious baseline noise crossings. This zero-crossing's signal is sent through the pulse generator 206 in order to create a clock pulse corresponding to each zero-crossing transition. In the currently preferred embodiment, the zero-crossings signal is XOR'ed with a delayed version of itself to create the clock pulses. In an alternative embodiment, the clock pulses may be generated by a one-shot being triggered by the zero-crossings signal. This clock signal is then passed through a delay circuit 207, which introduces a fixed delay. In the currently preferred embodiment, the delay is set to be approximately one period, T, of the channel clock. This delay is introduced in order to ensure that the clock pulses occur only after the polarity changes state. In other words, the zero-crossings signal is delayed long enough so as to allow the differentiated waveform enough time to have crossed the second (e.g., positive or negative) threshold following the zero-crossing. The delay is necessary because the change in polarity used to qualify the signal does not occur until after the zero-crossing had already occurred. These clock pulses are used to clock the latch 208. Hence, as soon as a change in the polarity is detected, the next delayed zero-crossing pulse is designated as being valid. In this manner, only the zero-crossings signals which immediately precede a change in the differentiated waveform's polarity are qualified and output as valid data.

FIG. 3 is a timing diagram showing the timing and waveforms for various signals of the differentiating qualifier channel. A sample analog signal, as may have been read from a disk, is shown as 301. The analog read signal 301 has six peaks 312–317. Peaks 312, 314, and 316 are positive peaks, while peaks 313, 315, and 317 are negative peas. The goal of the read channel is to correctly detect these peaks while rejecting spurious peaks. The present invention accomplishes this goal by first differentiating the analog read signal 301. The resulting differentiated waveform is shown as 302. It can be seen that for each of the valid peaks 312–317, the differentiated waveform 302 crosses the baseline 318 (i.e., a zero-crossing). For example, zero-crossing 319 corresponds to peak 312. Similarly, zero-crossings 320–324 respectively correspond to peaks 313–317. Note that there are also instances wherein the differentiated waveform 302 appears to touch or cross the baseline 318. Such instances are shown as 325–328. Due to baseline noise, these instances might cause false zero-crossings to be generated. It can be seen that the valid zero-crossings are straddled by positive/negative peaks of the differentiated waveform 302. These zero-crossings' corresponding to the positive peaks of the analog read signal 301 are preceded by a positive peak and of the differentiated waveform 302.

For example, the zero-crossing 319 corresponding to the positive peak 312 of the analog read signal 301 is preceded by the positive peak 331 and followed by the negative peak 339 of the differentiated waveform 302. Likewise, the zero-crossings corresponding to the negative peaks of the analog read signal 301 are preceded by a negative peak and followed by a positive peak of the differentiated waveform 302. For example, the zero-crossing 320 corresponding to the negative peak 313 of the analog read signal 301 is preceded by the negative peak 340 and followed by the positive peak 332 of the differentiated waveform 302. Note that the spurious zero-crossings are not straddled by a pair of differentiated positive/negative peaks. This fact is used to distinguish the valid zero-crossings corresponding to the real peaks over these false zero-crossings. A positive threshold level 329 and a negative threshold level 330 are established. A positive peak signal 303 is generated; it goes high whenever the differentiated waveform 302 exceeds the positive threshold 329. Thus, these positive peaks 331-334 of the differentiated waveform 302, which exceed the positive threshold 329, respectively causes pulses 335-338 of the positive peak signal 303 to be generated. Likewise, a negative peak signal 304 goes high whenever the differentiated waveform 302 falls below the negative threshold 330. Thus, those negative peaks 339-343 which fall below the negative threshold 330 causes pulses 344-348 of the negative peak signal 304 to be generated.

Based on these positive and negative peak signals 303-304, a polarity signal 305 is generated. The polarity signal 305 changes states whenever the differentiated waveform 302 changes polarity as indicated by the positive and negative peak signals 303-304. For example, the negative pulse 344 which follows the positive pulse 335 causes the polarity signal to change from a high state to a low state. This transition 349 occurs during the rising edge of pulse 344. The polarity signal 305 changes states again (to a high state as shown by edge 350) during the rising edge of the next positive peak pulse (i.e., pulse 336). The next negative peak pulse 346 changes the state of the polarity signal 305 back to a low state, as indicated by the falling edge 351. This process repeats for positive peak pulse 337, negative peak pulse 347, and positive peak pulse 338. Note that the two consecutive negative peak pulses 344 and 345 do not cause a change in the state of the polarity signal 305.

Next, a pulse is generated by each edge (i.e., rising and falling) of the polarity signal 305. These pulses represent a change in the polarity of the differentiated waveform 302. In the currently preferred embodiment, the pulses are generated by delaying the polarity signal 305. A delayed polarity signal is shown as 306. This delayed polarity signal 306 is exclusive OR'ed (XOR) with the original undelayed polarity signal 305. The resulting XOR'ed polarity signal 307 is comprised of a series of pulses which represent those instances when the differentiated waveform 302 changes polarity. This XOR'ed polarity signal 307 is used to enable a D-latch as described below.

The differentiated waveform 302 is also used to generated a zero-crossings signal 308. Each time the differentiated waveform 302 crosses the baseline 318, the zero-crossings signal 308 changes state. However, as discussed above, some of these zero-crossings are caused by baseline noise. These spurious zero-crossings are represented by the X's 352. The zero-crossings signal 308 is XOR'ed with a delayed version of itself in order to generate a signal 309 which has a pulse corresponding to each transition of the zero-crossings signal 308. For example, the pulses 355-364 represent the spurious zero-crossing 352. And the pulses 365-370 represent the respective transitions 371-376 of the zero-crossings signal 308.

Thereupon, the XOR'ed zero-crossings signal 309 is delayed by a time, T. The reason for introducing this delay is due to the fact that a change in the polarity cannot be detected until after the zero-crossing had already elapsed. Hence, a delay is chosen so as to assure that the zero-crossing occurs after the change in polarity. In the currently preferred embodiment, the delay time, T, is set to be approximately one channel clock period. The delayed zero-crossings signal is shown as 310. This delayed zero-crossings signal 310 is used to clock a D-latch, and the XOR'ed polarity signal is used to enable the D-latch. After each occurrence of an XOR'ed polarity pulse, the very next delayed XOR'ed zero-crossings pulse is designated as a valid data pulse. For example, the two spurious zero-crossings pulses 355 and 356 are ignored because they were not qualified by a previous polarity pulse. However, zero-crossings pulse 365 is a valid data pulse because it is the next zero-crossings pulse that follows the polarity pulse 344. This valid data pulse is shown as 383. Likewise, the three spurious zero-crossings pulses 357-359 are ignored because they have not been qualified by a preceding polarity pulse. In contrast, the zero-crossings pulse 366 is qualified by the polarity pulse 378. Likewise, the zero-crossings pulses 367-370 are all valid data pulses because they have been qualified by the respective polarity pulses 379-382. Thus, resulting output signal from the D-latch is the qualified data signal 311. Referring back to the analog read signal 301, it can be seen that data pulse 383 corresponds to the analog peak 312; data pulse 384 corresponds to the analog peak 313; and data pulses 385-388 correctly correspond to the respective analog peaks 314-317.

FIG. 4 shows a detailed circuit diagram of the currently preferred embodiment of the differentiating channel qualifier of the present invention. The differentiated analog read signal is input on lines 401 and 402. More specifically, the positive differentiated signal is input on line 401 to the positive terminal of comparator 403, and the negative differentiated signal is input on line 402 to the positive terminal of comparator 404. The negative terminals of comparators 403 and 404 are coupled to the positive and negative thresholds. The levels for these thresholds can be varied by potentiometer 405. The outputs from the threshold comparators 403 and 404 are input to SR flip-flop 406. When the positive threshold signal output from comparator 403 on line 407 goes high, the polarity signal output from the SR flip-flop 406 on line 409 also goes high. And when the negative threshold signal on line 408 output from threshold 404 goes high, the polarity signal on line 409 from the SR flip-flop 406 goes low. Hence, the output of the SR flip-flop corresponds to the positive and negative peaks of the analog read signal.

This polarity signal is delayed by delay line 410 (e.g., TZB30-10 manufactured by Rhombus Industries of Huntington Beach, CA). In the currently preferred embodiment, a 40 nanosecond delay is introduced. The delay corresponds to the period of the pulses generated by XOR gate 411. XOR gate 411 generates the pulses by performing an exclusive OR function on the delayed polarity signal on line 4 12 with the original polarity signal on line 409. Hence, the output from the XOR gate 411 is the XOR'ed polarity signal on line 414.

The differentiated waveform is also input to comparator 415. Comparator 4 15 outputs the zero-crossings signal on line 419. This zero-crossings signal is delayed by delay line 417. In the currently preferred embodiment, a 30 nanosecond delay is introduced. The delayed zero-crossings signal on line 418 is exclusive OR'ed with the original zero-crossings signals on line 419 by XOR gate 420. Hence, the output from the XOR gate 420 is the XOR'ed zero-crossings pulses on line 421. These XOR'ed zero-crossings pulses are delayed by delay line 422. In the currently preferred embodiment, a 40 nanosecond delay is introduced. The result is a delayed zero-crossings pulses signal on line 423.

The two gates 424 and 425 are used to generate a differential output signal on lines 426 and 427 containing the qualified data pulses. More specifically, gate 424 is a D flip-flop. Flip-flop 424 is clocked by the XOR'ed polarity signal on line 414. Each polarity pulse triggers the flip-flop 424 and its output on line 428 goes high. In turn, a high signal on line 428 enables the second D flip-flop 425. Flip-flop 425 is clocked by the delayed zero-crossings signal on line 423. Hence, the next time a zero-crossings pulse is generated on line 423, the Q output from flip-flop 425 goes high, and the Q output goes low. Thereby, a qualified data pulse has been generated and is output as a differential signal on lines 426 and 427.

Another delay line 429 is used to reset the two gates 424 and 425 after each qualified pulse. A voltage regulator (LM337) 430 is used to generate the reference voltage Vref. VH is generated by a diode 431 and resistor 432 combination.

Thus, a differentiating qualifier channel is disclosed. What is claimed is:

1. In a hard disk drive having a transducer for reading digital data from a disk, an apparatus for qualifying an analog read signal comprising:

a differentiator for differentiating said analog read signal to produce a differentiated signal;

a threshold circuit which generates a positive peak signal when said differentiated signal exceeds a positive threshold level and generates a negative peak signal when said differentiated signal exceeds a negative threshold level;

a threshold qualifier coupled to said differentiator for generating a polarity signal when there is a transition between said positive peak signal and said negative peak signal;

a zero-crossing generator coupled to said differentiator for generating a zero-crossing signal corresponding to said differentiated signal;

a first delay circuit coupled to said zero-crossing generator for delaying said zero-crossing signal to produce a delayed zero-crossing signal;

a gate coupled to said threshold qualifier and said first delay circuit which outputs a qualified data signal based upon said polarity signal and said delayed zero-crossing signal.

2. he apparatus of claim 1, wherein said polarity pulse generator is comprised of:

a second delay circuit for delaying said polarity signal to produce a delayed polarity signal;

an XOR gate for XORing said polarity signal with said delayed polarity signal to produce an XORed polarity signal, wherein said gate outputs said qualified data signal based upon said delayed zero crossing signal and said XORed polarity signal.

3. The apparatus of claim 1, wherein said first delay circuit delays said zero-crossing signal by approximately one period of a channel clock signal.

4. The apparatus of claim 1, wherein said gate is comprised of a latch which is enabled by said polarity signal and clocked by said delayed zero-crossing signal.

5. A method for qualifying an analog read signal comprising the steps of:

differentiating said analog read signal to produce a differentiated signal;

generating a positive peak signal with said differentiated signal exceeds a position threshold level;

generating a negative peak signal when said differentiated signal exceeds a negative threshold level;

generating a polarity signal when there is a transition between said positive peak signal and said negative peak signal;

generating a zero-crossing signal corresponding to said differentiated signal;

delaying said zero-crossing signal to produce a delayed zero-crossing signal;

outputting a qualified data signal based upon said polarity signal and said delayed zero-crossing signal.

6. The method of claim 5, wherein said polarity signal is generated by XORing a delayed polarity signal with an original undelayed polarity signal.

7. The method of claim 7, wherein said zero-crossing signal is delayed by approximately one period of a channel clock signal.

8. The method of claim 5, wherein said outputting step is comprised of the steps of:

enabling a latch according to said polarity pulses;

clocking said latch according to said delayed zero-crossing pulses.

* * * * *